United States Patent
Vernia et al.

(10) Patent No.: US 11,223,673 B2
(45) Date of Patent: Jan. 11, 2022

(54) MULTI-CLIENT/MULTI-SERVER MANAGING METHOD AND SYSTEM WITH A ROUTINE OF REJECTION OF ALREADY CONNECTED CLIENTS FOR BALANCING THE SYSTEM

(71) Applicant: ABB SCHWEIZ AG, Baden (CH)

(72) Inventors: Filippo Vernia, La Spezia (IT); Andrea Scarponi, San Feliciano—Magione (IT); Antonio Pace, Florence (IT); Emanuele Pancani, Lastra a Signa (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/469,252

(22) PCT Filed: Dec. 13, 2016

(86) PCT No.: PCT/EP2016/080812
§ 371 (c)(1),
(2) Date: Jun. 13, 2019

(87) PCT Pub. No.: WO2018/108250
PCT Pub. Date: Jun. 21, 2018

(65) Prior Publication Data
US 2019/0327295 A1  Oct. 24, 2019

(51) Int. Cl.
*H04L 29/08* (2006.01)
*H04L 12/26* (2006.01)
(52) U.S. Cl.
CPC ......... *H04L 67/1008* (2013.01); *H04L 43/08* (2013.01); *H04L 67/101* (2013.01); *H04L 67/1004* (2013.01)

(58) Field of Classification Search
CPC ............ H04L 67/1029; H04L 67/1008; H04L 67/1012; H04L 67/1002; H04L 67/101; H04L 47/70; H04L 43/08
See application file for complete search history.

(56) References Cited

U.S. PATENT DOCUMENTS

| | | | |
|---|---|---|---|
| 6,370,580 B2* | 4/2002 | Kriegsman | H04L 29/06 709/226 |
| 6,389,448 B1* | 5/2002 | Primak | H04L 67/1029 709/225 |

(Continued)

FOREIGN PATENT DOCUMENTS

WO  2007001151 A1  1/2007

*Primary Examiner* — Lashonda T Jacobs
(74) *Attorney, Agent, or Firm* — Patterson Intellectual Property Law, P.C.; Gary L. Montle

(57) ABSTRACT

The method comprises the following steps: connecting each client (5) to a respective one of said servers (3) and establishing a data communication between each client (5) and the respective server (3), thus forming a multi-client/multi-server network; 5 calculating a figure of merit for rejection (FoMR) for at least one client (5) con-nected to at least one of said servers (3), each figure of merit for rejection (FoMR) determining a probability of rejection of the relevant client (5) by the server (3); rejecting at least one client (5), which is connected to a server (3), and placing 10 said client in a non-connected condition; wherein the client to be rejected is selected on the basis of the figure of merit for rejection (FoMR); connecting the rejected client (5) to a server (3) again.

22 Claims, 4 Drawing Sheets

(56) References Cited

U.S. PATENT DOCUMENTS

| | | | | |
|---|---|---|---|---|
| 6,922,724 | B1* | 7/2005 | Freeman | G06F 9/505 709/223 |
| 7,231,445 | B1* | 6/2007 | Aweya | G06Q 10/00 709/219 |
| 8,159,961 | B1* | 4/2012 | Rai | H04L 67/42 370/252 |
| 8,499,086 | B2* | 7/2013 | Koning | H04L 67/1029 709/229 |
| 8,769,541 | B2* | 7/2014 | English | H04L 47/70 718/104 |
| 9,116,752 | B1* | 8/2015 | Petit-Huguenin | G06F 9/505 |
| 9,692,708 | B2* | 6/2017 | Dumitriu | H04L 67/1029 |
| 10,652,318 | B2* | 5/2020 | Rodriguez | H04L 67/1008 |
| 10,934,230 | B2* | 3/2021 | Hong | B01J 35/023 |
| 2002/0099831 | A1* | 7/2002 | Tsunogai | H04L 69/14 709/227 |
| 2005/0102676 | A1* | 5/2005 | Forrester | G06F 9/505 718/105 |
| 2007/0204046 | A1* | 8/2007 | Batta | H04L 67/101 709/226 |
| 2007/0233866 | A1* | 10/2007 | Appleby | H04L 67/1008 709/226 |
| 2008/0225710 | A1* | 9/2008 | Raja | H04L 67/1029 370/230.1 |
| 2010/0057828 | A1* | 3/2010 | Hofmann | G16H 40/20 709/202 |
| 2014/0007179 | A1* | 1/2014 | Moore | H04L 63/10 726/1 |
| 2014/0222895 | A1* | 8/2014 | Rai | H04L 67/02 709/203 |
| 2016/0065660 | A1* | 3/2016 | Miyata | H04L 67/1029 709/223 |
| 2016/0112304 | A1* | 4/2016 | Allen | H04L 67/1027 370/225 |
| 2018/0241825 | A1* | 8/2018 | Bolton | H04L 67/42 |
| 2019/0037026 | A1* | 1/2019 | Brooks | H04L 41/0896 |
| 2019/0068752 | A1* | 2/2019 | Brooks | H04L 67/1002 |
| 2019/0068871 | A1* | 2/2019 | Kasamatsu | H04N 5/232123 |

* cited by examiner

MULTI-CLIENT/MULTI-SERVER MANAGING METHOD AND SYSTEM WITH A ROUTINE OF REJECTION OF ALREADY CONNECTED CLIENTS FOR BALANCING THE SYSTEM

FIELD OF THE INVENTION

The present invention concerns multi-client/multi-server systems and methods for managing said systems.

BACKGROUND ART

Generally speaking, a multi-client/multi-server system is an aggregate comprised of several electronic devices operating as clients, which are in data communication with a plurality of electronic devices operating as servers. Each client is in a data communication relationship with at least one server. Each server is in turn in data communication relationship with at least one client, and usually with a plurality of clients. Servers can be connected to a gateway for communication with a remote monitoring center station. The servers are connected to the gateway through a fast and reliable communication channel, e.g. a TCP/IP network, which permits managing a high data bandwidth to forward information to the gateway. A wireless or a wired network is provided for connecting clients and servers.

Examples of multi-client/multi-server systems of this kind can be found e.g. in the field of renewable energy installations, such as wind turbine installations, fields of photovoltaic panels, fuel cells, and the like. The use of low-power devices, e.g. micro-inverters, involves the use of a large number of such inverters, e.g. up to several hundreds of inverters, which are distributed on the field. Each inverter represents a client of the multi-client/multi-server system. Each client is connected to a server and, due to the large number of clients, a plurality of servers are needed.

The channels connecting the clients to the servers must be managed carefully to prevent overload of communication data or problems related to the available bandwidth, for instance.

The physical positioning of the electronic devices (e.g. inverters connected to photovoltaic panels, wind turbines, fuel cells, or other renewable energy resources) on the field is not always predictable. Sometimes the photovoltaic panels, and therefore the electronic devices connected thereto, are installed on asymmetric roofs. In other situations they are spread over extensive fields.

One critical aspect of a multi-client/multi-server system concerns balancing the communication load between clients and servers in terms of data traffic bandwidth.

In some cases, clients are connected to the network through respective servers when they are powered by a renewable energy resource and leave the network when no energy is available. For instance, in solar power plants the inverters will connect to the network at sunrise and will leave the network at sunset. Similarly, inverters coupled to wind turbines will connect to the network only when wind is available. When the clients require connection to the network again, e.g. at sunrise, or when wind starts blowing again, the communication between each client and the respective server must be re-established correctly.

Especially when a wireless network is used to connect clients to servers, environmental factors can adversely affect client-server communication. In some cases, client-server connection can be lost. A client-server re-assignment may become necessary in such situations.

Various criteria have been developed to assign clients to servers in a multi-client/multi-server environment, to achieve proper load balancing. These criteria proved to be unsatisfactory.

A need therefore exists, for a more efficient criterion to manage load balancing in a multi-client/multi-server system.

SUMMARY OF THE INVENTION

According to the invention, a method is provided, for managing a multiclient/multi-server system, comprising a plurality of servers and a plurality of clients, each client requiring a connection to at least one of said servers. The method comprises the following steps:
  connecting each client to a respective one of said servers and establishing a data communication between each client and the respective server, forming a multiclient/multi-server network;
  calculating a figure of merit for rejection for a plurality of clients connected to at least one of said servers, each figure of merit for rejection determining a probability of rejection of the relevant client by the server;
  rejecting at least one client, which is connected to a server, and placing said client in a non-connected condition; wherein the client to be rejected is selected on the basis of the figure of merit for rejection, i.e. the higher the figure of merit for rejection of a client, the higher the probability for that client to be rejected;
  connecting the rejected client to a server again.

The figure of merit of rejection is a figure that takes into account one or more factors that are indicative for example of how the quality of the connection. The higher the figure of merit for rejection, the lower the quality of the connection. For example, the figure of merit for rejection can be calculated on the basis of the number of clients connected to a given server. The higher the total number of clients connected to said server, the higher the figure of merit for rejection, which indicates that the server is overloaded and the chance of rejecting one (or more) clients is consistently high. In this example, an identical figure of merit for rejection can be calculated for all clients connected to a given server, if the number of connected clients is the only parameter used. The figure of merit for rejection calculated for clients of a server, to which a low number of clients is connected, will be correspondingly low. In this scenario. The figure of merit for rejection can take into account not only the number of clients actually connected to a server, but also the number of total slots of that server, i.e. the highest number of connections which the server may support. In such case the figure of merit for rejection could e.g. be the inverse of the difference between the maximum number of clients connectable to the server and the number of actually connected clients.

The process of establishing a client-server connection can be performed on the basis of novel methods disclosed later on, or using any other known method, even an inefficient one. The routine of calculating a figure of merit for rejection, will improve the balance and efficiency of the network even if an inefficient method is used to establish a server-client connection.

The figure of merit for rejection can be calculated as a function of at least one of the following parameters: a quality of a client-server communication signal; an amount of buffer memory available for the client; a number of clients queueing for connection to a server; a number of total clients connected to the server; a number of total clients connected to servers of the system; or a combination of a plurality of said parameters.

If two or more parameters are used, an improved efficiency is obtained. For example two parameters can be used in combination, such as the total number of clients connected to a server and the quality of client-server communication signal. For each client connected to a server a figure of merit for rejection will be calculated on the basis of the two parameters mentioned above. The first parameter will be the same for each client, since it depends on the total number of clients connected to a given server. The second parameter can be different for each client. The figure of merit for rejection can be directly proportional to the total number of clients connected (or to the inverse of the difference between maximum connectable clients and total number of connected clients) and inversely proportional to the power of the connecting signal. The chance for a client to be rejected will increase as the total number of connected clients increases, and will decrease as the strength of the transmission signal increases.

This will cause a re-balancing of the network. Clients connected to overloaded servers will have a higher chance to be rejected, and thus to be re-joined to a different server. However, the chance of being rejected increases with decreasing transmission signal strength. Those clients connected to overloaded servers and having the weakest connections signal are those which will be most probably rejected.

By repeating the rejection process again and again, with a chance for each client to be rejected being a function of the connection quality, will gradually cause a re-balancing of the network.

If the figure of merit for rejection is calculated on the basis of more than one parameter, each parameter can be weighted or some of them can be weighted. Weighing factors can be used to multiply each parameter. The weighing factors can be constant, some can be constant and some variable, or all of them can be variable.

In the above mentioned example, the number of total clients connected to a server can be given a low weight and the communication signal can be given a higher weight, such that the signal quality will be more important in determining the chance of a client to be rejected, i.e. the poor signal quality will weigh more than the overloading of a server in determining the chance of a client to be rejected.

If the weights are not constant, e.g. one weighing factor can be variable as a function of another weighing factor or as one or more of the parameters involved in the calculation of the figure of merit for rejection.

According to some embodiments, the step of connecting a client to a server can comprise the following steps:
the client generates a request for connection;
when one of the servers receives a request for a connection from one of the clients, the server connects the requesting client thereto.

The method can include the following further steps:
the server receiving a request for connection from a client calculates a figure of merit for the requesting client;
the server sends a connection-accepting response to the requesting client with a probability, which depends upon the figure of merit;
the requesting client receiving a connection-accepting response joins the server and starts communication therewith.

The figure of merit, differently from the figure of merit for rejection, is used as a quality measure to provide a higher or lower probability for a given client to be joined to a given server.

The method using a figure of merit for joining a client to a server can be used either when the network is established for the first time, or for establishing a new connection each time a client is rejected.

Using both a figure of merit for joining a client to a server and a figure of merit for rejection for rejecting an already connected client results in a particularly efficient method of administering the network.

The figure of merit can be calculated as a function of at least one of: a client-depending factor; a server-depending factor; a transmission channel-depending factor; or a combination thereof.

For instance, the method can comprise the step of calculating the figure of merit on a combination of the following factors: a number of available slots of the server (i.e. the difference between maximum number of clients that can be connected to the server and total number of clients actually connected to the server); a strength of the transmission signal from the requesting client to the server; a number of requests for connection issued by the requesting client.

Further features and embodiments of the method according to the invention are set forth in the appended claims and are disclosed in the following description.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description, reference will specifically be made to a solar plant, comprised of an arrangement of photovoltaic panels and relevant inverters, these latter representing clients of a multi-client/multi-server installation. It shall however be understood that various features of the invention disclosed herein can be embodied in other kinds of installations and different environments, where clients and servers represent generic electronic devices in data communication relationship.

Figure 1:
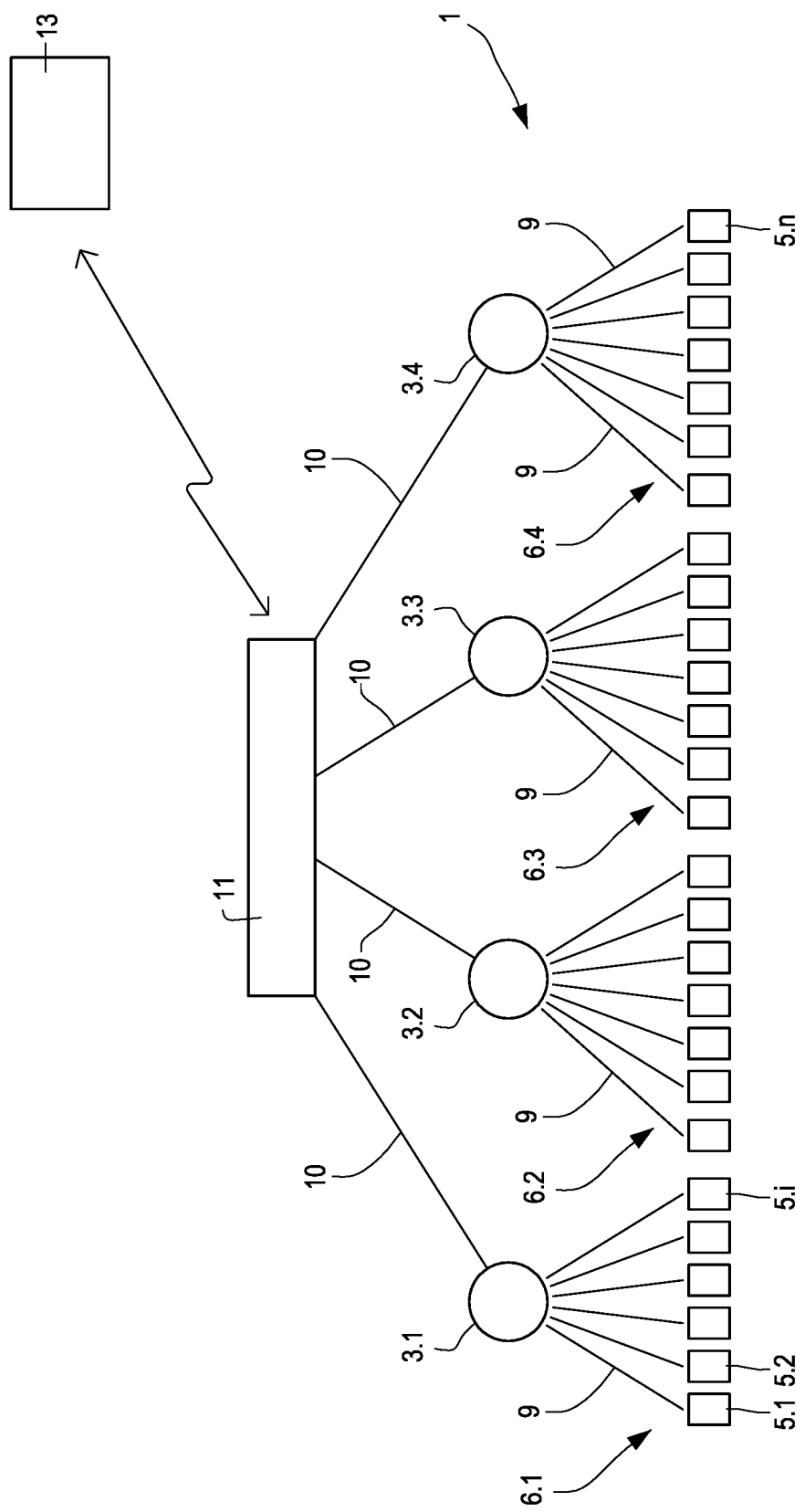
FIG. 1 illustrates a schematic of a multi-client/multi-server system, in which methods disclosed herein can be implemented.

In FIG. 1 a generic multi-client/multi-server network or system 1 is schematically represented. The system 1 can be comprised of a plurality of servers 3.1, 3.2, 3.3, 3.4. Each server 3.$j$ is a master device, whereto a plurality of slave devices or clients 5.1-5.$n$ can be connected, so as to be in data communication relationship therewith. Usually each client is in data communication relationship with only one server. In the schematic of FIG. 1, a first group 6.1 of clients is in data communication with server 3.1, a second group 6.2 of clients is in data communication with server 3.2, a third group 6.3 of clients is in data communication with server 3.3 and a fourth group 6.4 of clients is in data communication with server 3.4. Here below a generic server will be designated simply with reference number 3, a generic client will be designated with reference number 5 and a generic group of clients will be designated with reference number 6.

While in the schematic of FIG. 1 each group 6 of clients 5 comprises the same number of clients 5, it will become apparent from the following description that the number of clients 5 assigned to each server 3 can be different. Moreover, in the schematic representation of FIG. 1 six clients 5 are assigned to each server 3. It shall however be understood that this is by way of representation only and that in real installations a usually larger number of clients 5 can be in data communication relationship with each server 6. For instance each server 3 can comprise up to 30 communication slots or more, to connect with a corresponding number of clients 5.

Reference numbers 9 and 10 schematically represent communication channels between clients 5 and servers 3, and between servers 3 and a gateway 11, respectively. All servers 3 are connected to gateway 11. The gateway 11 can be connected to a remote monitoring center station 13. Channels 10 can be wired or wireless channels and may ensure a large bandwidth, for instance they can form a TCP/IP network (e.g. Ethernet, Wi-Fi, or the like). Small bandwidth channels 9, e.g. wireless connection channels can connect each client 5 to the respective server 3, which includes a relevant access point for connection to clients 5.

One aspect of the methods disclosed herein concerns the manner in which clients 5 connect to a respective server 3 for optimal load balancing. Other aspects of the methods disclosed herein concern ways to dynamically adapt the configuration of the multi-client/multi-server system 1, e.g. to variable environmental conditions, which may affect the strength of the transmission signal, for instance, or events which may cause one or more servers 3 to become inoperative.

As mentioned, clients 5 can be any kind of electronic devices. In the exemplary embodiment described herein some clients 5 are inverters or micro-inverters of a photovoltaic panel installation. It shall moreover be understood that clients 5 can be electronic devices of the same kind or category (e.g. all inverters or micro-inverters), or else they can include electronic devices of different kinds, for instance inverters, repeaters, network extenders, sensors and the like, in combination.

Figure 2:
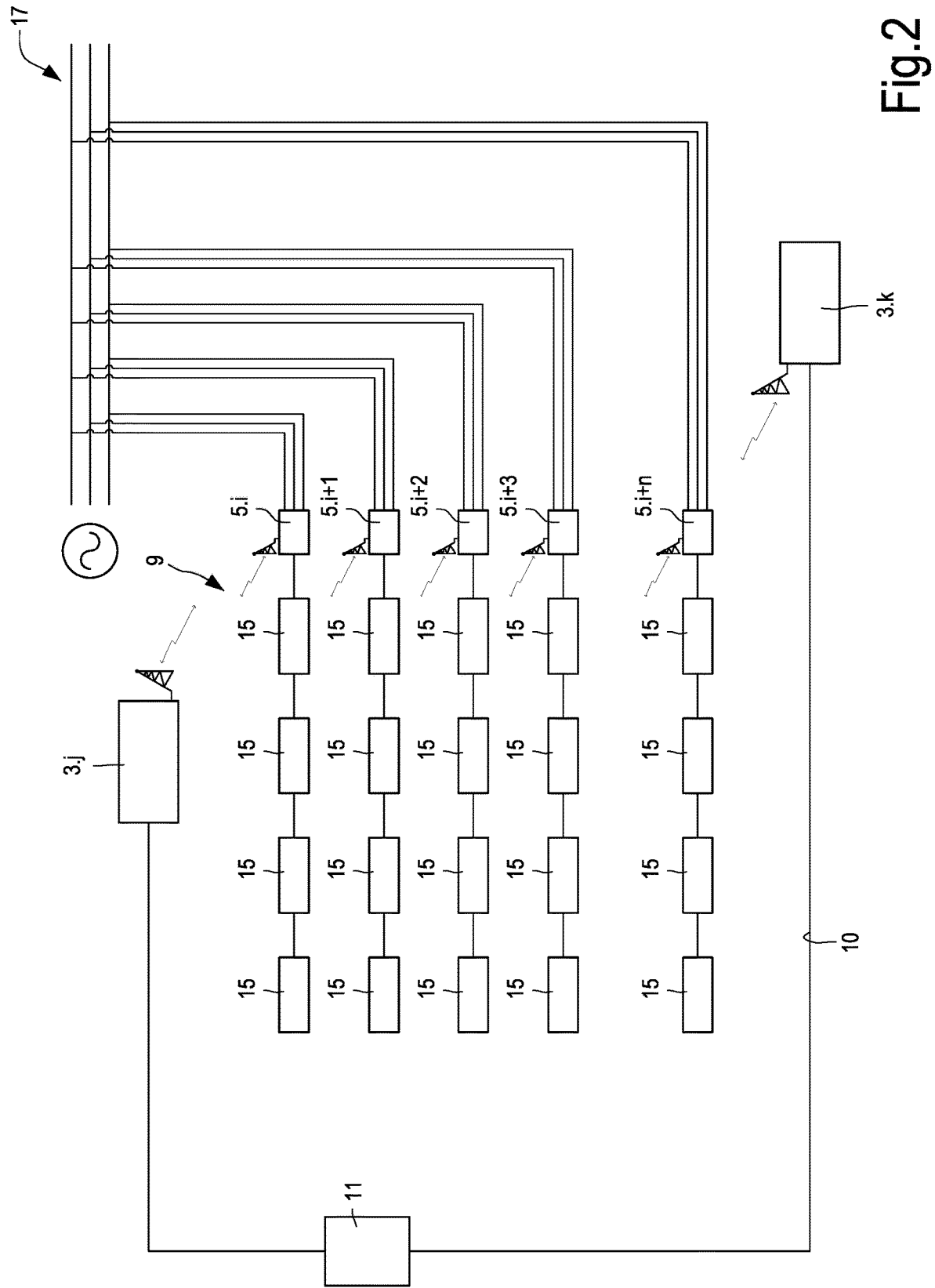
FIG. 2 schematically illustrates a portion of a photovoltaic panel installation configured as a multi-client/multi-server system.

The inverters or micro-inverters have input terminals electrically connected to photovoltaic panels and output terminals electrically connected to an electric power distribution grid. The DC current generated by the photovoltaic panels is converted into AC current by micro-inverter. The AC current is delivered to the electric power distribution grid to power local loads and/or for distribution to a public electric power distribution grid. FIG. 2 schematically illustrates a portion of a photovoltaic plant comprised of rows of photovoltaic panels 15, each connected to a respective inverter or micro-inverter 5 (5.$i$, 5.$i$+1, 5.$i$+2, . . . . ). The clients 5 (e.g. inverters, micro-inverters, or other electronic devices) are electrically connected to the electric power distribution grid 17 and each micro-inverter 5 is in data communication relationship with at least one server 3 (3.$i$, 3.$j$).

Figure 3:
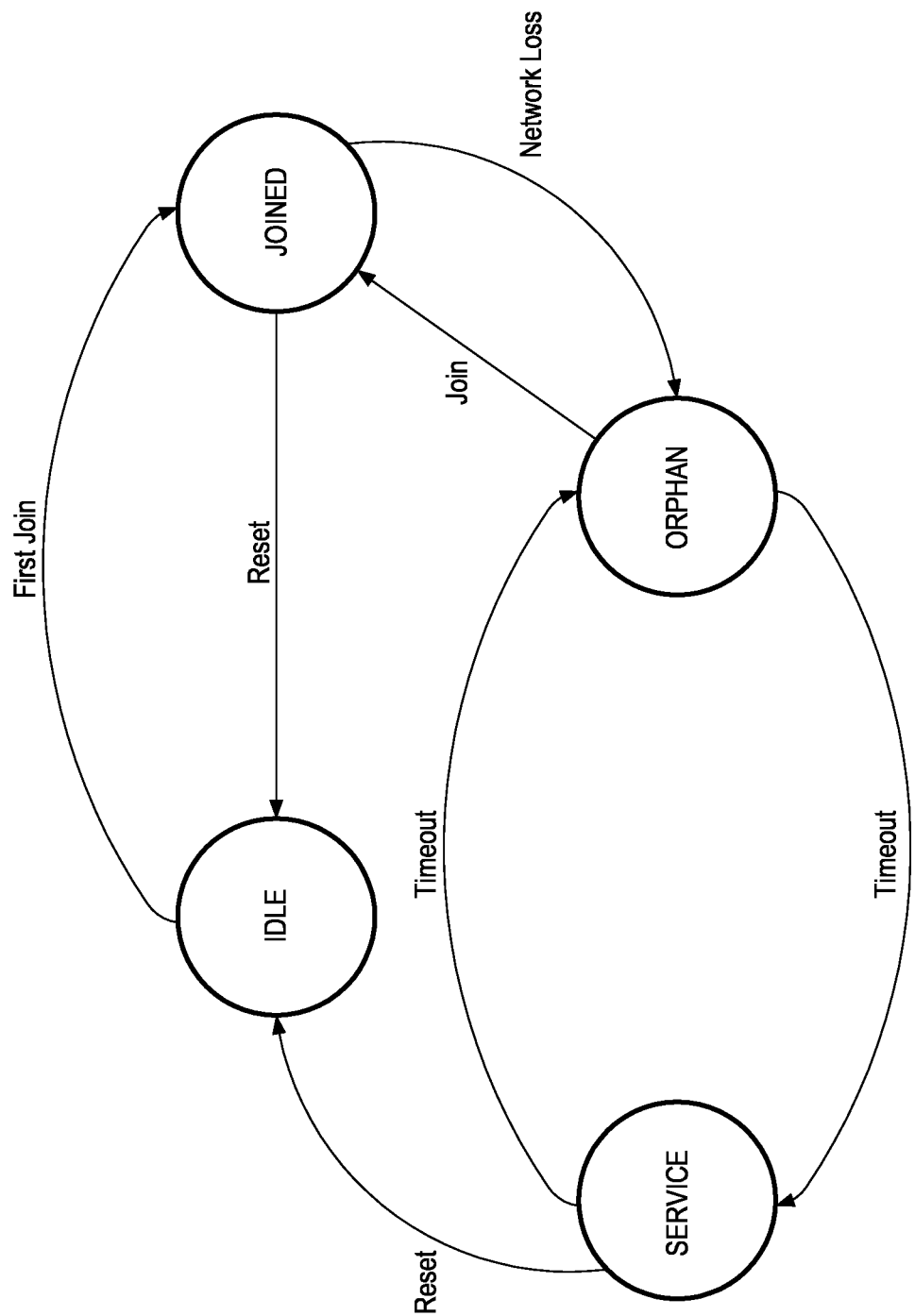
FIG. 3 illustrates a diagram of the statuses and actions which can be taken by each client.

According to some embodiments, each client 5 can take several statuses and perform several actions, in order to join the clients/servers network. FIG. 3 schematically illustrates four statuses, which each client 5 can take. Arrows schematically represent actions which a client 5 can perform to switch from one status to another. The four client statuses represented in FIG. 3 are defined as follows:

IDLE: this is the status of the client 5 prior to being linked to the network 1, e.g. when it is first delivered from a factory and installed in system 1, or once it has been reset to factory default values. As will be explained later on, according to some embodiments this status can be forced by a server of the network; i.e. a client 5 can be forced back in the IDLE status by a server 3, it has been previously connected to;

JOINED: this is the status where the client 5 is connected to a respective server 3 and, through said server 3, with the remote monitoring center station 13. The client 5 is in data communication with the remote monitoring center station 13 and can send/receive data, commands or instructions. Each server 3 can be identified by a server identification number. E.g. server 3.$j$ can be identified by identification number ID_server_j. Once joined to server 3.$j$, the generic client 5.$i$ will be able to communicate with said server only, unless special reset actions are taken, as will be disclosed here below. The network or system 1 can in turn be identified by a network identification number ID_Network;

ORPHAN: if, for whatever reason, communication between the client 5 and the relevant server 3 is lost, the client 5 will be set in the ORPHAN status. This may happen e.g. due to loss of the communication signal in a wireless communication network, caused by temporary environmental disturbance factors. A client 5 can be set in the ORPHAN status for instance also due to a temporary loss of power supply to the client 5 and/or to the respective server 3. In solar power plants, all clients 5 will switch to the ORPHAN status at sunset, since the loss of power supply will turn the network off. Similar situations may occur e.g. in wind turbine installations in case of lack of wind;

SERVICE: in this status client 5 requires service intervention from the plant managing staff.

As schematically represented by the arrows in FIG. 3, each client 5 can move from one status to another. For instance, a client 5 in an IDLE status can switch to the JOINED status through a "first join" action. In some embodiments, a client 5 can be switched back from a JOINED status to an IDLE status through a reset action. According to the schematic of FIG. 3 a client 5 can also be switched back into the IDLE status from a SERVICE status. A client 5 in a JOINED status can switch into an ORPHAN status, for instance if the network is lost, i.e. if for whatever reason communication between the client 5 and the selected server 3, whereto the client 5 is joined, is interrupted. From the ORPHAN status the client 5 can switch back to the JOINED status or to the SERVICE status. From the SERVICE status the device 5 can switch to an IDLE status or back to an ORPHAN status. These switching actions will now be described in greater detail. The above mentioned statuses and actions can be provided in some exemplary embodiments of the system disclosed herein. In other embodiments a different number of statuses (for instance less) can be provided for and/or a different set of actions can be foreseen to switch from one status to another.

Each client 5 in an IDLE status has to join a server 3 of the network 1 to start communication therewith and with the gateway 11. As noted above, the IDLE status differs from the ORPHAN status since the IDLE status is taken by a client 5, which has never joined the network or system 1, or has been reset. Conversely, the ORPHAN status is taken by a client 5, which has lost connection with a server 3, it was previously connected to.

When the system or network 1 is first set-up, all clients 5 are in an IDLE status and must be switched into a JOINED status. If the system 1 is expanded, e.g. if additional photovoltaic panels and relevant micro-inverters (or other generic electronic devices such as sensors, repeaters, etc.) are added to the network or system 1, each newly added client 5 will be in an IDLE status and shall join the system 1 by establishing communication with one of the available servers 3.

To establish a new connection between a client 5 in an IDLE status and a server 3, according to some embodiments the client 5 that is in the IDLE status will send repeated requests for connection to a server 3. The request for connection to a server 3 can be a broadcast message, addressed to all servers 3 of the network 1. When a server 3 receives a request for connection from a client 5, the server 3 has to decide whether or not the request for connection can be accepted. According to some embodiments, a routine is provided, for establishing a client-server connection, according to a connection policy. Embodiments disclosed herein provide for routines which allow a balanced distribution of clients 5 among the various servers 3 of the system 1.

According to some embodiments each server 3, which receives a request for connection from a client 5 in an IDLE status, calculates a figure of merit (herein after also shortly named FoM), based upon which the probability of establishing a connection with the requesting client 5 is calculated. In currently preferred embodiments, the FoM is calculated on the basis of more than one factor, for instance a server-depending factor and a client-depending factor, or else a client-depending factor and a transmission channel-depending factor, or a server-depending factor and a transmission channel-depending factor or combinations of more than two factors. Each factor can be expressed as a percentage, i.e. its value can range between 0 and 99.

In general terms, a server-depending factor is any factor, which depends upon one or more conditions, parameters or statuses of the server 3. According to some exemplary embodiments, the server-depending factor can take into account the number of available slots, i.e. the total amount of possible server-client connections which the server 3 can support, minus the number of clients 5 already connected to said server 3. If N is the total number of available slots and M is the total number of clients 5 which already joined the server 3, the number of available slots is N-M. For instance, if the number N of slots available is 30 and the number M of clients 5 already connected to said server 3 is 10, the server-depending factor which is used to calculate the FoM can be a probability of accepting a new connection defined as $$\frac{N-M}{N} * 100 = \frac{30-10}{30} * 100 = 66.\overline{6}$$

Another server-depending factor can be the server reaction time. Yet further server-depending factors can include the traffic amount and/or the amount of data stored in a server.

A client-depending factor is any factor, which depends upon one or more conditions, parameters, statuses of the client 5. According to exemplary embodiments disclosed herein, a client-depending factor can be the number of unsuccessful requests for connection already sent by that specific client 5.

Each server 3 can comprise a counter for a given client 5, which is increased each time a request from that client 5 is received and that client is not accepted by the server, and which may be decreased periodically, e.g. as a function of time.

According to embodiments disclosed herein, each client 5.j can be identified by a client identification number ID_client_j. Said ID_client_j identification number can be transmitted along with the request for connection, such that any server 3 receiving the request for connection can also identify which client 5 is sending the request for connection. In this way, each server 3 can be programmed to store the number of requests for connection received by each client 5.

In other embodiments, each client 5 can include a counter, which counts the number of requests for connection generated by that client 5, said information being transmitted along with the request for connection. Each server 3 will thus be informed about the number of requests for connection generated by a given client 5 and can use said number as a client-depending factor to calculate the FoM.

Another client-depending factor can be the kind and amount of data generated by the client. As noted above, clients 5 need not to be identical to one another and may even belong to different categories of devices. Inverters and micro-inverters are typical clients which generate a large amount of data, while sensors are clients which generate less data. A factor taken into consideration in the FoM calculation can be therefore the intensity of data traffic generated by a client. A server that is already handling a large number of data may calculate a higher FoM for a client which is a low-traffic generator, and a smaller FoM if the client is a high-traffic generator.

One of the purposes of establishing a connection between a client 5 and a server 3 is to transmit data collected by the client 5 to the remote monitoring center station 13 via channel 9, server 3, channel 10 and gateway 11. In some embodiments, each client 5 can comprise a buffer storage memory, wherein data are temporarily stored. For instance, if the client 5 is a micro-inverter of a photovoltaic system or any other generic electronic device, the buffer storage memory can store data on voltage, current, power, temperature or other operating parameters or status, alarms, logs of events related to the device, as a function of time. Data can be periodically sampled to collect information on the above mentioned parameters as a function of time.

Since a client 5 must be connected to a server 3 in order to transmit the data to the remote monitoring center station 13, a client-dependent factor for the calculation of the FoM can include the buffer storage memory available for that particular client 5. The smaller the available buffer storage memory, the larger the probability for that specific client 5 to join a server 3, and vice-versa. In other words, clients 5 having less available storage memory take precedence over clients 5 having a larger available buffer storage memory, in order to avoid loss of collected data. The available buffer storage memory can thus be used as a client-dependent factor for calculating the figure of merit. Information on available buffer storage memory can be transmitted by client 5 to servers 3 along with the request for connection.

A transmission channel-depending factor is any factor, which depends upon one or more conditions, parameters, statuses of the transmission channel 9. For instance the strength of the transmission signal can be used as a parameter indicative of the transmission quality. Particularly in case of wireless transmission, environmental conditions, such as weather conditions, external sources of electromagnetic noise and the like can strongly affect the strength of the radio signal transmitted by a client 5 and received by the servers 3. In general terms, joining the server 3, which receives the strongest signal from a given client 5 can contribute to optimum exploitation of the transmission bandwidth, since it is in general preferable for a client 5 to join that server 3, wherewith the best data communication conditions can be established. Thus, a transmission channel-depending factor for the calculation of the FoM can be the strength of the signal received by the server 3.

For example, if the maximum Received Signal Strength Indication (RSSI) is 200 and the maximum RSSI of a client is 150, the transmission channel-depending factor can be calculated as:

$$\left[1 - \frac{(200 - RSSI)}{200}\right] * 100 = \left[1 - \frac{50}{200}\right] * 100 = 75\%$$

According to further embodiments, a transmission channel-depending factor is the number of clients each server 3 "sniffs" in the communication network. This can help the server to figure out who and how other servers perform the client management and make appropriate informed decisions.

Two or more of the factors mentioned above can be used in combination to one another. Different combinations of different factors can be used.

In some embodiments, one, some or all factors used for calculating the FoM can be weighted with a constant or variable weight, such that either one or the other of said multiple factors can have a stronger influence on the resulting FoM.

By way of example, let A, B and C be factors contributing to the calculation of the figure of merit, wherein:
A is a server-depending factor, e.g. the number of available slots;
B is a client-depending factor, e.g. the number of requests for connection already issued by the client 5, which were unsuccessful;
C is a transmission channel-depending factor, e.g. the strength of the signal received by server 3 from a client 5.

The FoM can be calculated as a function $f$ of A, B, C and of relevant weights as follows:

$$FoM = f\left(\frac{\alpha A + \beta B + \gamma C + \ldots}{\alpha + \beta + \gamma + \ldots}\right)$$

wherein $\alpha, \beta, \gamma$ are weights applied to A, B and C. It shall be understood that more than just one server-depending factor, one transmission channel-depending factor and one client-depending factor can be used. In simpler embodiments only one or only two of said factors A, B, C can be used, instead. In more complex embodiments, more than three factors can be used in combination, each with or without a weight. In yet further embodiments, each factor can have the same weight, i.e. $\alpha=\beta=\gamma=1$.

In some embodiments the weights $\alpha, \beta, \gamma$ can be constant. In other embodiments, however, one, some or all weights $\alpha, \beta, \gamma$ can be variable. For instance, if the number of available slots is particularly high, i.e. if there are much less clients 5 than there are slots available in that particular server 3, the weight applied by the server 3 to factor A can be high. However, if the number of clients increases, e.g. as more clients 5 are added to the system 1, the weight applied to factor A can be reduced.

According to some embodiments, one or more servers 3 can be connected to one another, such that information can be exchanged between servers 3. While it is not necessary for all servers 3 of a network 1 to be in mutual data communication relationship, communication between all servers 3 can be useful under certain conditions. Communication between servers 3 can be obtained through channel 9. Each server 3 can thus use data from other servers 3 of the network 1 to calculate the FoM when a request for connection is received by a server 3 from a client 5. Thus, according to some embodiments, a further server-dependent factor can be used in calculating the FoM, which factor can be dependent upon information exchanged between servers in mutual data communication relationship.

According to exemplary embodiments, the total number of already connected clients 5 (i.e. the total number of clients 5 in the JOINED status) can be known if all servers 3 of the network 1 are in mutual data communication relationship. In some embodiments the information can be even more detailed and can include the number of clients 5 connected to each server 3. The FoM can then cure a situation where the server 3 receiving a request for connection determines that it has a number of clients 5 already connected thereto which is substantially lower (or else substantially higher) than the number of clients connected to other servers. This information can be used as a factor in the calculation of the FoM. In some embodiments, if server 3 determines that the number of clients 5 connected thereto is lower than the mean number of clients 5 connected to the remaining servers, a high value can be attributed to the factor involved in the calculation of the FoM. A low value for said factor will be used in the opposite situation.

According to some embodiments, an exchange of information between servers 3 can further be used to assess which server 3 has calculated the highest FoM for a given requesting client 5 and will thus establish a connection with the requesting client 5. The server 3 which calculated the highest FoM will accept the requesting client 5 and initiate a data exchange relationship therewith.

In some embodiments, if a requesting client 5 transmits a broadcast connection request, several servers 3 will usually receive the request and each of them will calculate the relevant FoM. The network 1 can be configured to compare several FoMs calculated by several servers 3 for one and the same request for connection. The highest FoM will automatically determine which server 3 will accept the requesting client 5 and establish a connection therewith. One, some or all servers 3 can be configured to receive and compare FoMs from a plurality of servers 3. Or a dedicated device, such as the remote monitoring center station 13 can be in charge of establishing which is the highest FoM.

The routine for connecting a client 5 requesting a connection can for instance provide for the following steps:

the client transmits a connection request, e.g. through a broadcast message;

a plurality of servers 3 receive the request for connection;

each receiving server 3 calculates a figure of merit FoM for the requesting client;

the servers which calculated a FoM exchange information to determine which server has calculated the highest FoM;

the server with the highest FoM is informed that it has been selected as the one that has to establish a connection with the requesting client;

the selected server 3 emits a connection-accepting response, identifying the server;

the client receives the connection-accepting response and connection is established.

In other embodiments, the routine for connecting a client 5 requesting a connection can for instance provide for the following steps:

the client transmits a connection request, e.g. through a broadcast message;

a plurality of servers 3 receive the request for connection;

each receiving server 3 calculates a figure of merit FoM for the requesting client;

each server 5 which calculated a FoM transmit the calculated FoM to the client 5;

the requesting client 5 determines which server has calculated the highest FoM and informs the server 3 accordingly;

connection is established between the selected server 3 and the client 5. The higher the FoM calculated by a server 3, the higher the possibility for that server to establish connection with the requesting client 5. Thus the FoM calculated by a server represents a probability of establishing a connection with the server. In other embodiments, selection of the highest calculated FoM is not provided. Irrespective of the method used for the calculation of the figure of merit, the FoM calculated by a server 3 determines the probability for a client 5 requesting connection to be accepted by said server 3 as follows. The FoM can be comprised between 0 and 99, or can be normalized to 100, i.e. the FoM represents a percentage of chances for the requesting client 5 to be accepted by the server 3. Each server receiving a request for connection, i.e. a request to join, from a client 5 calculates a FoM for that client.

Several possible ways can be used to utilize the calculated FoM as a percentage of probability for the client 5 to be accepted by the server 3.

In some embodiments, each server 3 can include a random number generator which generates numbers comprised between 0 and 99. Once the FoM has been calculated and a random number has been generated, the random number and the FoM are compared. If the random number is comprised between 0 and the calculated FoM, the requesting client 5 is accepted and the server 3 transmits a connection-accepting response to the requesting client 5. If the generated random number is higher than the calculated FoM, the request is not accepted. In this latter instance, a connection-refusing response can be transmitted to the requesting client 5.

Alternatively, the server can simply provide no response to the request. In both cases the request from the requesting client 5 is refused by the server 3, either actively through a connection-refusing response, or passively, i.e. by not responding to the request.

Therefore, the higher the FoM calculated by a given server 3 for a given connection requesting client 5, the higher the chances for that client 5 of receiving a connection-accepting response.

According to other embodiments, an external parameter, e.g. the environment temperature, can be used instead of a random number. A temperature sensor providing a temperature with accuracy up to one hundredth of a degree Celsius can be used and the last two digits of the temperature value can be compared with the calculated FoM. Let XX.yy ° C. be the measured temperature: the number yy will be compared with the calculated FoM. The requesting client 5 will receive a connection-accepting response or a connection-rejecting response (which may also include the case of no-response from the server) as follows:

| | |
|---|---|
| if 00 ≤ yy ≤ FoM | a request-accepting response is transmitted |
| if FoM < yy ≤ 99 | no response is transmitted, or a request-rejecting response is transmitted. |

Based on the above routine, for each client 5 in an IDLE status that sends a request for connection, none, one or some servers 3 will generate a connection-accepting response. If no server 3 generates a connection-accepting response, the client 5 will issue a new request for connection and the above described routine will be repeated. If only one server 3 generates a connection-accepting response, the client 5 will join said server 3 and start communicating therewith. If more than one server 3 generates a connection-accepting response, the client 5 will join one of said servers. For instance, the client 5 can join the server 3, the connection-accepting response whereof first reached the requesting client 5 or decide which server is best "positioned" to offer the connection. Several methods can be used to help this decision (e.g. RSSI, # messages seen, etc.).

These approaches allow a client-accepting routine to be run based on the figure of merit, without the need for comparing FoMs calculated by several servers 3. The higher the FoM the higher the chance of being connected to a given server 3.

As noted above, if servers 3 communicate with one another, the FoMs calculated by several servers 3 for a given client 5 requesting connection can be compared and connection is established with the server 3 which calculated the highest FoM. Selection of the highest FoM can be performed by the servers 3, or can be performed by the remote monitoring center station 13. In further embodiments, one or some servers 3 can be selected to act as masters, which receive the FoMs values calculated by several servers and comparing the calculated FoMs to select the highest one.

The above described routines allow a balanced distribution of clients 5 among several servers 3 of the system 1. A client 5 which receives a connection-accepting response and joins a server 3, switches from the IDLE status to the JOINED status.

The connection-accepting response may contain the ID_server_j identification number of the server 3.*j*. The client 5.*i* will therefore identify the server 3.*j* it is joined to. Moreover, the server 3.*j*, whereto the client 5.*i* is joined, can be configured to receive and store the ID_client_i identification number of client $5.i$. In this way, each server 3 generates and stores stored list of all clients 5 connected thereto and all clients store the relevant ID_server_j identification number. Moreover, as noted above, the network 1 can be identified by a network identification number ID_Network. Each server 3 and each client 5 can store the ID_Network identifying the network 1, it is joined to.

In case of loss of connection, this information is useful for the client $5.i$ to re-join server $3.j$. As will become apparent from the description below, it is not essential for each server $3.j$ to have a univocal ID_server_j. Actually, in some embodiments all servers 3 of a given system may have the same ID_server_j identification code or identification number. According to other embodiments, each server $3j$ can have its own ID_server_j identification number and store the ID_Network identification number, to identify the network 1, the server belongs to.

Whenever a new client 5 is added to the system or network 1, for instance when new photovoltaic panels are added to the solar plant (or any other electronic device is added to the network 1), the newly added client 5 will be in an IDLE status and will start a routine for joining one of the available servers 3. The method described so far ensures correct distribution of clients 5 among servers 3, to obtain a fair load balancing and taking into consideration also possible environmental conditions, which may affect the strength of the transmission signal.

Once a client 5 is in a JOINED status, several events can cause loss of connection. For instance, weather conditions (snow, rain or fog) may have an impact on wireless communication. Similarly, electromagnetic disturbances can generate noise, which adversely affects the client-server communication and may lead to disconnection. In solar plants, clients and servers will switch off at sunset, due to loss of power supply. In wind turbines installations, clients and servers can switch off when wind stops. In those instances, one, some or all clients 5 in a JOINED status will switch into an ORPHAN status. In the diagram of FIG. 3 this event is represented by the arrow marked "network loss".

According to some embodiments, a client $5.i$ in an ORPHAN status will generate a request for connection to the server $3.j$, it was previously connected to, i.e. to the server identified by the identification number ID_server_j. Re-joining from an ORPHAN status, therefore, does not require the above described routine to be performed again.

As noted above, more servers 3 can have the same identification number ID_server_j. In this case, a client in an ORPHAN status may join either one or the other of the servers identified by the same ID_server_j identification number.

In order for the generic client $5.i$ to join the correct server $3.j$, among the several servers having the same ID_server_j identification code, i.e. the one it was connected prior to be set in the ORPHAN status, data stored in the servers can be used. As noted above, each server $3.j$ may store the ID_client_i identification number of each client $5.i$ connected thereto. Now, if a client $5.i$ in an ORPHAN status requires connection to server(s) identified by the server identification number ID_server_j, only the server $3.j$, whereto the requesting client $5.i$ in the ORPHAN status was previously connected, will accept the client $5.i$ again and set it back into the JOINED status. This allows several servers 3 with the same ID_server_j identification number to be used, without any risk of wrong re-joining of clients $5.i$ to servers $3.j$, since each server will rejoin only the clients 5, which were connected thereto prior to be set in the ORPHAN status.

If the plant is identified by a network identification number ID_network, each client 5 and each server 3 can have the network identification number ID_network stored therein. A client 5 requesting to rejoin the server from an ORPHAN status will transmit a request to rejoin, that can contain the server identification number ID_server_j and the network identification number ID_network, such that the servers receiving the request can immediately recognize if the requesting client $5.i$ belongs to the same network 1. Wrong associations between clients and servers belonging to neighboring networks is thus avoided.

In some embodiments, the ID_network identification number can be used instead of, or in combination with the ID_server_j identification number. In this case the ID_network identification number can be used for rejoining. Thus a client 5 in an ORPHAN status can join any server of the network 1. Each server receiving a request for connection can be configured to accept the request only if the requesting client $5.i$ is in the list of previously connected clients 5. Rejoining becomes a fast procedure.

In other embodiments, a server $3.j$ receiving a request for connection from an orphan client $5.i$ can start a FoM calculation routine and determine whether or not to accept the requesting client, irrespective of whether said client was previously connected to said server or not. This will cause a re-distribution of clients among servers when switching from the ORPHAN status to the JOINED status again.

According to some embodiments, the method can be configured to prevent interruption of communication or to restore communication between clients 5 and the remote monitoring center station 13 when a server $3.j$ becomes either permanently or temporarily inoperative. A server $3.j$ may become permanently inoperative in case of fault or breakdown, for instance. A server $3.j$ may become temporarily inoperative, e.g. due to a temporary loss of connection caused by a disturbance on the transmission channel 10 or on the transmission channel 9.

If at least two servers $3.j(1)$ and $3.j(2)$ share the same ID_server_j identification number, in case of breakdown of one of said servers, any client $5.i$ connected thereto can be joined to the remaining server $3.j(2)$ with the same ID_server_j as follows. Upon breakdown of server $3.j(1)$, the clients $5.i(1)$ connected thereto switch in an ORPHAN status and start sending a request to join. Server $3.j(2)$ which is still operative receives the request for connection and determines that the requesting client $5.i(1)$ is not in the list of clients connected thereto. Server $3.j(2)$ can be configured such that it will not accept the requesting client $5.i(1)$ until a given delay time $\Delta t$ has lapsed. Once the delay time $\Delta t$ has lapsed, server $3.j(2)$ will accept the requesting client $5.i$ (1), either immediately or upon calculation of a FoM. If several servers $3.j$ share the same ID_server_j identification number, each of said servers will perform the same routine. The requesting clients $5.i(1)$ which were switched into the ORPHAN status following breakdown of server $3.j(1)$ will thus gradually rejoin one or the other of the remaining servers $3.j$ which are still operative and have the same ID_sever_j identification number.

According to some embodiments, if each server $3.j$ has its own univocal ID_server_j identification number, the above re-assignment procedure can be run on the basis of the ID_network identification number or code. The clients $5.i$ which switch in the ORPHAN status as a consequence of server $3.j$ breakdown will start sending a request for connection. The remaining servers will determine that the request comes from a client belonging to the same network (which is evidenced by the ID_network identification number contained in the request for connection). Upon lapse of a given delay Δt, the servers 3 which are operative will run a FoM calculation routine as described above, to join the requesting client to a new server 3.

Figure 4:
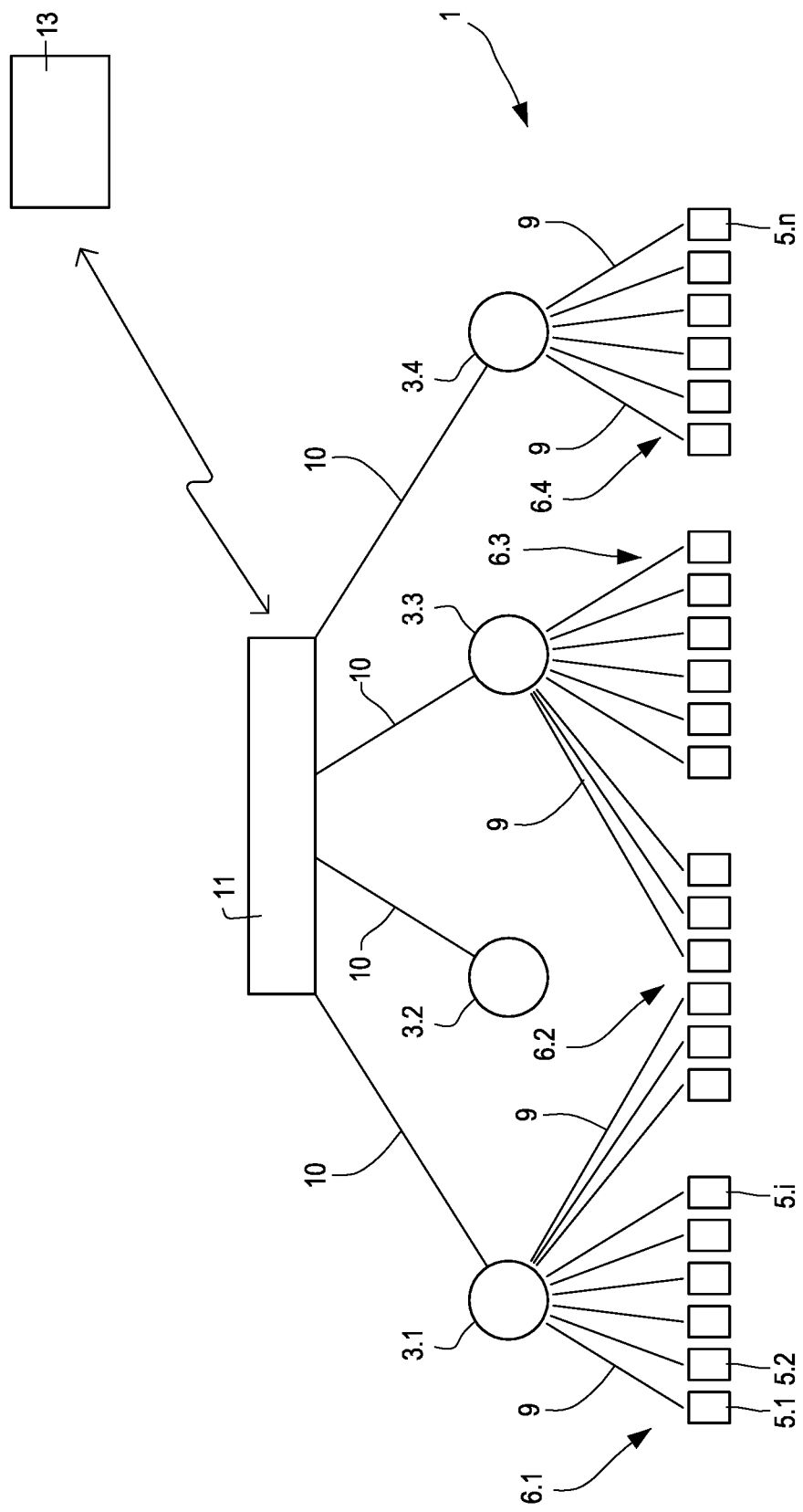
FIG. 4 illustrates the schematic of FIG. 1 in a situation where one of the servers is out of service.

The result of clients re-assignment in case of a sever breakdown is pictorially represented in FIG. 4. In this example server 3.2 is assumed to be broken The clients 5.*i*-5.*j* belonging to group 6.2 are re-assigned partly to server 3.1 and partly to server 3.3.

The above described status/action scheme provides an additional anti-theft feature. If the client-server connection is lost e.g. because the client is fraudulently removed from the system 1, the client 5 will switch into the ORPHAN status and will not join a server of another network or system 1 and becomes therefore unusable.

According to some embodiments, each server 3 may contain information on all clients 5 belonging to the system 1. In some embodiments, a storage memory can be provided for that purpose in each server 3 or in some of said servers. This can be done by loading the ID_client_j identification numbers manually in each server, or by transmitting said information to each server 3 from the remote monitoring center station 13 through the gateway 11 and the channel 10. Two additional functions can thus be achieved.

On the one hand, an anti-theft function is added to the servers 3. Each server 3 can accept only clients 5 of the network or system 1, it belongs to, and will become useless if introduced in a different system. Moreover, if two systems are installed at a distance such that clients 5 of one system can be "seen" by servers 3 of the neighbor system, no overlapping or erroneous assignment of clients 5 of the first system to servers of the second system, or vice-versa, is possible.

If the request for re-joining the server generated by a client 5 in an ORPHAN status does not result in the connection be re-established, e.g. because the server 3 is broken and the re-assignment routine described above does not properly operate or is not provided for, or for other reasons, the client 5 can switch from the ORPHAN status to a SERVICE status, as represented in FIG. 3. This can occur after a pre-set timeout. A client 5 which is in the SERVICE status can be re-set in the IDLE status.

According to some embodiments, the clients 5 can be configured such that they switch back into the ORPHAN status after a given period of time. The two arrows labeled "timeout" between the ORPHAN status and the SERVICE status in FIG. 3 indicate that a client 5 can be switched back and forth between the ORPHAN status and the SERVICE status. If the event which caused a client 5 to switch into the ORPHAN status ceases, the client 5 can thus connect to its server 3 again. For instance, if a broken server 3 is replaced by a new server 3, and if the new server 3 is given the same ID_server_j identification number, all clients 5 previously joined to the broke server will join the replacing server 3.

If a client 5 is set in the SERVICE status and cannot connect to its server 3 again, e.g. because the server is broken and is not replaced and a re-assignment routine to a different server is not provided for or does not operate properly, the anomalous situation can be detected at the remote monitoring center station 13, for instance because no data from the client 5 concerned are received anymore. A manual service intervention can then be triggered. In some embodiments, service intervention can be performed by personnel in charge of the system 1. The client 5 which is in the SERVICE status and does not succeed in getting back in the JOINED status is re-set into an IDLE status manually. This action is schematically represented by arrow "re-set" in FIG. 3, connecting the SERVICE status with the IDLE status. Once the client 5 has been reset in the IDLE status, it will perform the above described routine for joining a new server 3.

The above described method of operation can be further improved in order to cope with variable network conditions, for instance. As noted above, weather or other factors, such as electromagnetic noise or the like can have an impact on the strength of the signal. The conditions may change during time to such an extent that the selected client-server connections are not optimized under modified conditions.

Further factors which can influence or modify the operation of the system include the addition of new clients 5 to network 1. Each newly added client 5 can join the network 1 by switching from the IDLE status to the JOINED status as described above through a FoM calculation routine. However, if the already established client-server connections are not modified, it may well happen that the configuration of the system, which is achieved upon addition of several clients 5, is not optimized. In other words, it may be that if the system or network 1 is enlarged by adding elements or components (either servers or, more often, clients), a different distribution of clients and servers may result in a more balanced network.

Improved embodiments of the methods disclosed herein provide means for dynamically adapting the configuration of the system 1 to modified operating conditions, or number of clients 5, for example.

According to said embodiments, each server 3 can reject one or more clients 5 assigned thereto and reset said client(s) back in the IDLE status. This action is represented in the scheme of FIG. 3 by the arrow marked "reset" between the JOINED status and the IDLE status of a generic client 5. This function allows the client-server connections to be modified and dynamically adapt the system to variable conditions.

The rejection function and consequent reset in the IDLE status can be used to achieve different goals, as will be described here on.

For instance, it can be used form managing a number of clients 5 which is larger than the total slots available, i.e the total number of client connectable to the servers 3. In the schematic of FIG. 1 four servers 3 are provided. Assuming each server 3 can manage 30 clients 5, the maximum number of clients 5 that can be simultaneously connected to the gateway 11 through servers 3 is 120. If the total number of clients 5 is larger than 120, the rejection and reset function can be used to cyclically reject one or more clients and allow other clients 5 from a waiting list to join the rejecting server 3.

The rejection and reset function can be further used to manage situations where the number of clients 5 is small enough to be managed by the servers 3 provided in the network 1, but one or more servers 3 become temporarily or permanently unavailable, e.g. due to breakdown or fault. As described above, a re-assignment of the clients 5 switched to the ORPHAN status due to server breakdown can be provided, to distribute the clients 5 in the ORPHAN status to a new server 3. However, the number of total available slots may become less than the total number of clients 5 to be connected.

The rejection and reset function can also be used to re-arrange the server-client connections to take into account possible variable environmental conditions, variability of the total number of active clients 5, or any other dynamic occurrence that may affect the overall structure or operation of the network 1.

In simple embodiments, each client 5 connected to a server 3 can be cyclically rejected upon expiration of a maximum connection time, for instance. The rejected client 5 is reset in the IDLE status and will start a routine for joining a server 3 again. The newly established connection can be the same as the previous one, i.e. the client 5 can join the same server 3. Alternatively, the client 5 can join a different server 3. This will depend upon the actual conditions of system or network 1 at the time the request for connection is issued by the client 5.

Re-joining can be through a FoM calculation routine as described above.

According to other exemplary embodiments, a figure of merit for rejection (here on shortly referred to as FoMR) is calculated by a server 3, to establish if and which one of the clients 5 connected thereto will be rejected and reset in the IDLE status. The FoMR can be calculated on the basis of one or more factors. The FoMR determines the probability for a given client 5 to be rejected by the respective server 3 and be reset in the IDLE status.

According to some embodiments, one factor, upon which the FoMR for a given client 5 can be calculated, is based on the strength of the signal received from the client 5 concerned. The strength of the signal can be expressed as RSSI. According to one approach, the contribution to the FoMR can be the lower, the higher the RSSI is. This means that clients 5, wherefrom the server 3 receives a weak signal, have a higher percentage of probability of being rejected. According to this approach, the system will attempt to re-distribute clients 5 to get improved connection signals. Since the strength of the signal can vary as a function of events, such as environmental conditions, the FoMR calculated for a given client 5 can vary during time. The FoMR can be calculated cyclically, at regular or random intervals, and for the same client 5 the FoMR can change.

According to some embodiments, another factor, upon which the FoMR can be calculated, takes into account the amount of buffer storage memory, which is available for a given client 5 for collecting data. Since a client 5 in an idle status cannot transfer data from the buffer storage memory thereof to the gateway 11 through server 3, the less space is available for data storage, the lower is the chance for the given client 5 to be rejected and reset in an idle status. This factor takes into account the need of avoiding loss of data.

According to yet further embodiments, yet further factor, upon which the FoMR for a given client 5 can be calculated, is a function of the previous status of the client 5. If the client 5 concerned has remained for a long time in an IDLE status before receiving a connection-accepting response to join the server 3, the probability of being set in the IDLE status again shall be low. Such factor is aimed at making the time of lack of connection as uniform as possible among the various clients belonging to the network 1, and to avoid a situation where some clients 5 will remain in the IDLE status for a longer time than others.

As for the FoM, also the FoMR can be calculated on the basis of one, two or more factors used in combination. Each factor can be weighted and each weight can be either constant or variable. In some embodiments, one or more weights can be a function of one or several other weights or factors.

In general terms, therefore, the FoMR can be a function (g) of one or more factors A', B', C'. Each factor can be weighted with a weight α', β', γ'. The FoMR can thus be expressed as $$FoMR = g\left(\frac{\alpha' A' + \beta' B' + \gamma' C' + \ldots}{\alpha' + \beta' + \gamma' + \ldots}\right)$$

According to some embodiments, the routine for rejecting a client 5 and resetting said client 5 in the IDLE status is similar to the routine for switching a client 5 from the IDLE status to the JOINED status. For a given client the FoMR is calculated and given a value comprised between 0 and 99. A number between 0 and 99 is generated in any suitable manner, e.g. through a random number generator, and the two entities are compared. If the random number is comprised between 0 and FoMR, the client 5 is rejected, otherwise it remains joined to the server 3. Since the rejected client 5 is placed in the IDLE status, it will start the procedure to join a server 3 again.

According to some embodiments, the server 3 can calculate a FoMR for each client connected thereto and reject the client 5 for which the highest FoMR has been calculated.

If servers are in mutual data communication relationship, according to some embodiments a rejection policy can be coordinated among several servers 3. In some embodiments, clients 5 will be selectively rejected based upon the calculated FoMR and by comparing FoMRs for clients 5 joined to different servers. It can thus be envisaged that FoMRs calculated by several severs 3 are compared, and the client(s) with the higher FoMR(s) among all the clients 5 connected to the various servers (or some of said clients) is(are) rejected. In this scenario, the number of clients rejected by each server 3 can vary from server to server. In other embodiments, a conditioning function can be provided, such that, in addition to selecting the client 5 to be rejected, a threshold to the maximum number of clients that can be rejected by one and the same server 3 can be set.

Since clients 5 are rejected and reset in the IDLE status, the network 1 is capable of managing a number of clients 5 larger than the total number of available slots. In such case, there will always be a waiting list of queueing clients 5 in the IDLE status, requesting connection to a server. The number Q of queueing clients 5 will normally be equal to the total number of clients 5 minus the total number of slots available. This, however, is not mandatory. In some conditions the number of queueing clients can be higher, e.g. if one or more servers 3 can temporarily not be reached.

It is thus possible for a number N of servers 3, for instance, to manage a number of clients 5 which is larger than the number of total slots available. The frequency of rejections can be set a priori for each server 3, or can be changed according to needs. For instance, the frequency of rejections, i.e. the frequency at which each server 3 rejects a client 5 by resetting it into the IDLE status, can depend upon the number of clients 5 of the system in excess of the total available slots, i.e. to the number of queueing clients 5.

In some embodiments the frequency of rejection can be determined on the basis of the total number of clients 5 connected to a server 3. The larger the number of clients connected, the higher the frequency of rejection.

In some embodiments, if servers 3 communicate to one another, the frequency of rejection for each server 3 can be modulated according to the actual distribution of clients among several servers. For instance, servers 3 having a larger number of clients 5 connected thereto can be given a higher frequency of rejection, and servers 3 having a smaller number of clients 5 connected thereto can be given a lower frequency of rejection.

According to exemplary embodiments of the method disclosed herein, measures can be taken to reduce the queueing time. According to some embodiments, the number of queueing clients 5 requesting to re-join a server 3 can be used to accelerate the rejection rate. The larger then number of clients 5 which have been re-set in the IDLE status and which are waiting to rejoin a server 3, the higher the rejection rate, to provide a faster flow of clients and to shorten the waiting time. The presence of servers 3, which are in a fault condition may also be used to increase the rate of rejection. In both cases a factor taking into consideration the above mentioned conditions may be added in the formula for the calculation of the FoMR.

In the above described scenario, rejection of a client 5 is determined by switching the client from the JOINED status to the IDLE status. However, in other embodiments the rejection may be determined by switching the client 5 from the JOINED status to the ORPHAN status. Specifically, if some or all servers 3 are identified by the same ID_server_j identification number, or if a common ID_network identification number is used, a dynamic adaptation of the network 1 is possible through cyclic rejection and re-joining, even if the clients 5 are switched in an ORPHAN status rather than in an IDLE status.

According to some exemplary embodiments, if a sub-group of servers 3.j shares the same ID_server_j identification number, a client 5, which is rejected by a server 3.j by switching the client 5 in an ORPHAN status, will be rejoined to one of the servers of said sub-groups.

If all servers of the network 1 have the same ID_server_j identification number, or else if the ID_network identification number (which is the same for all servers) is used instead of the ID_server_j identification number, each client 5 which is rejected and switched in the ORPHAN status, will start a routine for joining a server 3 and will be potentially able to join any one of the servers 3 in the network 1.

As described above, according to some embodiments the servers 3 can communicate to one another. One purpose of mutual communication between servers 3 can be to set and/or modify a policy used for calculating the FoM and/or the FoMR. For instance, servers 3 can communicate with one another to set appropriate weights for the calculation of the FoM and/or the FoMR.

According to exemplary embodiments, servers 3 can communicate with one another, so that each server 3 is informed about the total number of clients 5 which are in the system 1, or the total number of clients in the JOINED status. It can also be possible for each server 3 to know how many clients 5 are in data communication relationship with each other server 3. This information can be used, for instance, in order to start a rejection routine if an unbalanced situation is noticed. Servers 3 having a higher load, i.e. a larger number of clients 5 connected thereto, may be forced to initiate or accelerate a rejection policy. If one or more servers 3 are connected to an overly large number of clients compared to other servers 3, the rejection policy may assist in re-balancing the distribution of client-server connections.

Moreover, according to some embodiments, data communication between servers 3 is used by a server 3 to check if the client 5 which it intends to reject can be accepted by another server and the FoMR can be calculated on the basis of a factor that depends upon the probability for the client 5 to be joined to another server 3. Transmission channel sniffing techniques can be used, for instance, to determine how many of the remaining servers can "see" the client 5 which is about to be rejected. According to some embodiments, the rejecting server 3 can determine whether and how many other servers 3 have available slots to accept the client 5, which is about to be rejected. The FoMR can be calculated taking this factor into consideration.

According to exemplary embodiments, data from other servers 3 can be used as a further server-depending factor in the calculation of the FoM or of the FoMR. For instance, if a client 5 in an IDLE status is requesting connection, the FoM calculated by a server 3 receiving the request can take into consideration how many other clients 5 are already joined to the remaining servers 3. If the server 3, which calculates the FoM has a number of clients 5 already connected thereto, which is lower than the mean number of clients 5 connected to each remaining server 3, the FoM will be increased accordingly. The FoM will be decreased if the number of clients 5 already connected to said server 3 is higher than a mean number of clients 5 connected to the remaining servers 3.

According to some embodiments, the servers 3 are configured to periodically check if each server 3 of the system is operative. Exemplary embodiments provide for routines for this purpose. If the checking routine is successfully completed, all servers 3 are operating. If one server 3 is broken, information on the broken server can be obtained.

In some embodiments, a checking routine include sending a broadcast checking message. Each server 3 replies to the checking message. If a response is missing, the server 3 is broken. One of the servers 3 of the system 1 can be configured as a master to perform this routine. The master will broadcast the checking message and collect the received responses, one from each remaining server 3. Each response contains information sufficient to identify the responding server 3. The master can alert the remote monitoring center station 13 if one or more servers 3 do not reply to the checking message.

According to other embodiments, the checking routine can be run through the remote monitoring center station 13. This latter may send a command message, asking all the servers 3 to provide a response indicative of their status. A broken server 3 will not respond.

If servers 3 have self-test capability, information on the problem of a non-properly working server 3 can also be collected at the remote monitoring center station 13. Service intervention can thus be programmed.

According to some embodiments, the remote monitoring center station 13 can be programmed to determine whether regular data flows are received from each server 3 of the network 1. Absence of data flow, or altered data flow from one server 3 can be interpreted as an alert on possible server malfunctioning. The remote monitoring center station 13 can be programmed to perform a status check on the server concerned.

According to exemplary embodiments, an anomalous situation concerning one of the servers 3 of the network 1 detected by the remote monitoring center station 13 can start a client-reassignment routine. In some embodiments, the client-re-assignment routine is controlled by the remote monitoring center station 13. Information is transmitted to the remaining servers 3 that the clients 5 assigned to the malfunctioning or broken server 3 shall be re-assigned. Each one of the remaining servers 3, which receives a request from the clients 5 in the ORPHAN status previously assigned to the malfunctioning or broken server 3, will accept the request for connection. The re-assigned clients 5 may store the ID_server_j identification number of the new server 3 and the new server 3 will store the ID_client_k identification number of the newly connected client 5, for future rejoining from the ORPHAN status.

Once the broken server 3 is replaced by a new server 3, a re-balancing routine can be started to re-balance the client distribution. A re-balancing routine command can be sent by the remote monitoring center station 13 once the server 3 has been replaced. The re-balancing routine can involve a rejection routine by the servers other than the newly replaced one. Rejections of the clients 5 in the JOINED status will gradually re-balance the clients distribution among the servers 3.

According to the embodiments described so far the multi-client/multi-server network 1 is established by connecting each client 5 to a respective server 3 through a routine that involves the calculation of a figure of merit FoM, based on one or more factors. These latter can be client-dependent factors, server-dependent factors, channel-dependent factors, for example, or combinations thereof. Once a client 5 has been connected to a server 3 and is in data communication therewith, a figure of merit for rejection FoMR can be calculated, which is used to re-balancing the network, e.g. in order to take into account events that may change the conditions of the network. A rejected client 5 will start a routine for rejoin a server 3, which involves the calculation of the FoM.

However, according to other embodiments, the criterion of cyclically rejecting clients 5 which are already connected to a server 3, in order to improve the network balancing, can be used also in combination with a different way of establishing the first or subsequent client-server connection.

Several methods are known to those skilled in the art, in order to generate a multi-client/multi-server network, which have proven unsatisfactory for several reasons. According to some embodiments of the methods according to the present disclosure, any method can be used to create a first multi-client/multi-server network, irrespective of how inefficient the method is. Once the network has been established, it can be balanced by cyclically causing each server 3 to reject one or more of the clients 5 connected thereto, by using the above described routine based on the calculation of a Figure of Merit for Rejection FoMR. This will automatically re-balance the network, gradually and automatically achieving an optimum balanced network structure.

Each client 5 which has been rejected by the server 3 it was connected to can join a server 3 again using the method described above, involving the calculation of a Figure of Merit (FoM). In other embodiments, however, the rejected client 5 can join a server 3 again using any possible connection method, e.g. those known from the current art.

The invention claimed is:

1. A method for managing a multi-client/multi-server system, comprising a plurality of servers and a plurality of clients, each client requiring a connection to at least one of said servers; the method comprising the following steps:
   connecting each client to a respective one of said servers and establishing a data communication between each client and the respective server, thus forming a multi-client/multi-server network;
   at least one of said servers calculating a figure of merit for rejection for at least one client selected from among clients connected to said at least one of said servers, each figure of merit for rejection determining a probability of rejection of the at least one client by the at least one of said servers;
   rejecting the at least one client from the at least one of said servers, and placing said client in a non-connected condition;
   wherein the at least one client is selected on the basis of the figure of merit for rejection; and
   the rejected at least one client starting a routine for joining one of said servers again.

2. The method of claim 1, wherein the figure of merit for rejection is calculated as a function of at least one of the following factors: a quality of a client-server communication signal; an amount of buffer memory available for the at least one client; a number of clients queueing for connection to a server; a number of total clients connected to the server; a number of total clients connected to servers of the system; or a combination of a plurality of said parameters.

3. The method of claim 2, comprising the step of weighing at least one factor, whereupon the figure of merit for rejection depends, with a weighting coefficient.

4. The method of claim 2, comprising the step of weighing each of a plurality of factors, whereupon the figure of merit depends, with a weighting coefficient.

5. The method of claim 1, wherein the step of connecting a client to a server comprises the following steps:
   the client generates a request for connection; and
   when one of the servers receives a request for a connection from one of the clients, the server connects the requesting client thereto.

6. The method of claim 5, wherein:
   the server receiving a request for connection from a client calculates a figure of merit for the requesting client;
   the server sends a connection-accepting response to the requesting client with a probability, which depends upon the figure of merit; and
   the requesting client receiving a connection-accepting response joins the server and starts communication therewith.

7. The method of claim 6, comprising the step of calculating the figure of merit on a combination of the following factors: a number of available slots of the server; a strength of the transmission signal from the requesting client to the server; a number of requests for connection issued by the requesting client.

8. The method of claim 6, comprising the step of calculating the figure of merit as a function of at least one of: a client-depending factor; a server-depending factor; a transmission channel-depending factor; or a combination thereof.

9. The method of claim 8, comprising the step of weighing each factor, whereupon the figure of merit depends, with a weighting coefficient.

10. The method of claim 8, comprising the step of weighing at least one factor, whereupon the figure of merit depends, with a weighting coefficient.

11. The method of claim 10, wherein at least one weighting coefficient is variable, and preferably all the weighting coefficients are variable.

12. The method of claim 10, wherein the weighting coefficient of at least one factor is a function of at least one of the other factors.

13. The method of claim 10, wherein at least one weighting coefficient is constant.

14. The method of claim 5, wherein:
   when servers receive a request for connection from one of the clients, the servers calculate respective figures of merit for the requesting client;
   the figures of merit calculated by said servers are compared, and the requesting client will be joined to the server that has calculated the highest figure of merit.

15. The method of claim 14, comprising the step of calculating the figure of merit as a function of at least one of: a client-depending factor; a server-depending factor; a transmission channel-depending factor; or a combination thereof.

16. The method of claim 15, wherein the figure of merit is further calculated on a factor indicative of an amount of free data buffer memory of the requesting client.

17. The method of claim 15, comprising the step of weighing at least one factor, whereupon the figure of merit depends, with a weighting coefficient.

18. The method of claim 15, comprising the step of weighing each factor, whereupon the figure of merit depends, with a weighting coefficient.

19. The method of claim 1, further comprising the step of exchanging information between a plurality of said servers.

20. The method of claim 19, wherein the step of exchanging information between a plurality of servers comprises the steps of:

comparing the figure of merit for rejection calculated by a plurality of servers; and rejecting the client which has the highest figure of merit for rejection.

21. The method of claim 19, wherein the step of exchanging information between a plurality of servers comprises the steps of:

comparing the figure of merit calculated by a plurality of servers for a requesting client; and sending a connection-accepting response to the requesting client from the server which has calculated the highest figure of merit for that client.

22. The method of claim 1, wherein the clients are configured such that when a client has joined a server, further communication will be only through the server, which the client has joined.

* * * * *